M. UNGER.
AUTOMATIC WEIGHT AND COST SCALE.
APPLICATION FILED JUNE 23, 1906.
914,764.
Patented Mar. 9, 1909.
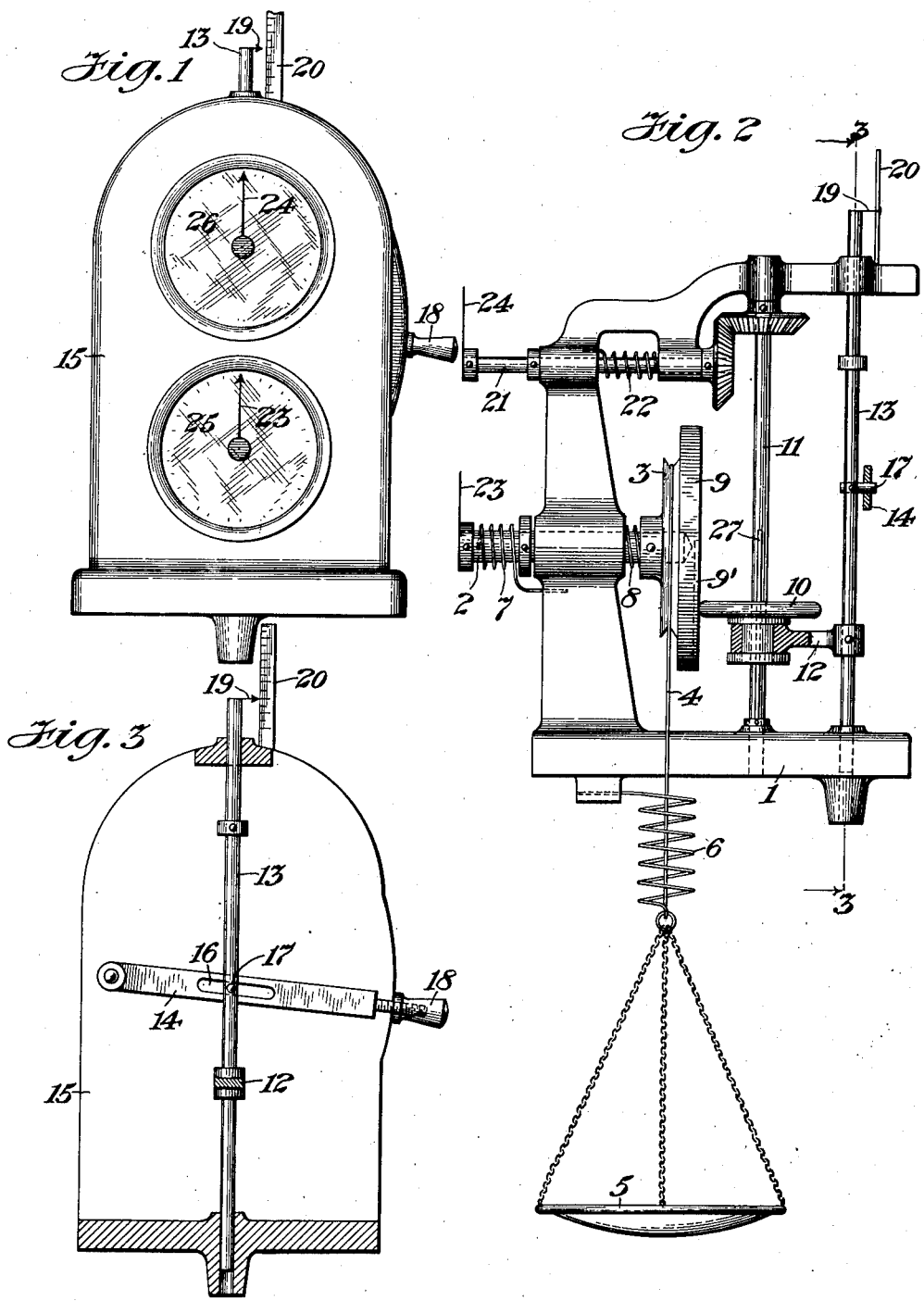
Witnesses
Chas. F. Clagett
Abram Lifeld
Magnus Unger, Inventor,
By his Attorney Lewis J. Doolittle

UNITED STATES PATENT OFFICE.

MAGNUS UNGER, OF SCHENECTADY, NEW YORK.

AUTOMATIC WEIGHT AND COST SCALE.

No. 914,764.  Specification of Letters Patent.  Patented March 9, 1909.

Application filed June 23, 1906. Serial No. 322,985.

*To all whom it may concern:*

Be it known that I, MAGNUS UNGER, a naturalized citizen of the United States, and resident of Schenectady, in the county of Schenectady and State of New York, have invented certain new and useful Improvements in Automatic Weight and Cost Scales, of which the following is a specification.

This invention relates to an automatic scale, which is designed to perform the double function of indicating the weight and the price of the article placed thereon.

It consists essentially of two relatively movable indicators mounted upon a suitable frame, and adapted to indicate the weight and cost upon suitable dials. The movement of said indicators is automatically controlled and the proportionate amount of relative movement predetermined by suitable and adjustable means. The weight of the goods causes said relative movement, which is therefore directly proportional thereto.

The details of construction of one embodiment of my invention are represented in the accompanying drawings.

Like parts in the several views are indicated by like figures of reference.

Figure 1 is a front elevation showing the indicating dials. Fig. 2 is a side elevation, with the casing removed to show the internal construction. Fig. 3 is a cross sectional view taken in the plane indicated by the line 3—3 of Fig. 2.

In the embodiment of my invention as represented in the drawings, 1 represents a standard or frame upon which is mounted in suitable bearings a rotatable shaft 2, to which may be attached, at one extremity, a suitable pulley 3, adapted to receive circumferentially and be rotated by a flexible supporting member 4. Said supporting member 4 may be attached at one extremity to a suitable scale-pan 5, in operative connection with a tension weight spring 6 attached to said standard or frame 1. Said rotating member 2 may be provided with suitable spring 7 which is adapted to resist the rotation of said member 2 caused by the weight upon the scale pan 5 and return the same to its zero position when the weight is removed from the pan 5.

A friction disk 9 may be positioned at the inner extremity of the shaft 2 and held by means of a spring 8 in contact with a suitable friction wheel 10 which when in its normal or zero position is out of contact with the friction disk 9, by reason of a radial slot or recess 9' which is provided in said disk at this point. The sliding movement of the friction disk 9 caused by the spring 8 may be limited by a suitable collar on the shaft 2 to an amount sufficient to cause a small pressure between the disk 9 and the friction wheel 10 and rotate the latter when the disk is turned by the pulley 3, as described. The friction-wheel 10 may be splined or slidably mounted upon a shaft 11 journaled in said standard or frame 1. As illustrated in the drawings a key 27 is attached to the shaft 11, which key is of sufficient length to permit the sliding of the friction wheel 10 upon the shaft 11 to obtain the desired adjustment and resultant relative movement between the members. In the embodiment of my invention as herein represented, I have provided as means for adjusting the position of said friction wheel 10 upon said shaft 11, a suitable support 12 attached to a reciprocating member 13, which may also be journaled in said standard or frame 1. The support 12 may also form a bearing in which the wheel 10 is rotated. Said reciprocating member 13 may be adjusted and held in position by a lever 14 provided with a handle 18 adapted to be tightened against said casing 15 when the lever 14 shall have been placed in the desired position. An index 19 may be provided to register the position of the members upon a suitable dial 20 in terms of unit price, or other desired terms. Said shaft 11 is in operative connection with a rotating shaft 21 journaled in said frame or standard 1. Said shaft 21 may be provided with a torsion spring 22 to resist the rotation thereof and also to return the same and the indicator 24 to its zero position when the weight indicator 23 is in its zero position and the slot 9' in the disk 9 standing opposite the friction wheel 10, which at this point is out of engagement therewith and consequently free to be rotated, as described. Suitable indicators or pointers 23 and 24 may be provided at the outer end of their respective shafts to indicate the amount of rotation thereof upon suitable dials 25 and 26 in terms of weight and cost, respectively, or any other desired units.

In the operation of the above embodiment of my invention, the article of weight being placed upon the scale pan 5, the shaft 2 is rotated by the pulley 3 and flexible support 4, the weight thereof being indicated on the scale 25 by the indicator 23. The friction wheel 10 being brought into contact with the disk 9 by the rotation thereof is in turn rotated to a greater or less degree according as it is positioned at a greater or less distance from the center of said disk 9. To place said friction wheel 10 in the desired position, the lever 14 is moved up or down according as it is desired to adjust the wheel 10 at a less or greater distance from the center of the disk 9. A support 12 is adapted to carry and slide the friction wheel 10 upon its shaft 11. Said support is attached to a sliding member 13 which is moved up or down by the lever 14 which may be pivotally attached at one end to the casing 15 and provided with a slot 16 adapted to receive a pin 17 attached to said sliding member 13. A threaded handle 18 may be provided which is adapted to be tightened against the casing 15 and hold the parts in the desired position.

An index 19 may be provided at the upper end of the sliding member 13 to indicate the position in which the parts are adjusted in any desired terms upon a suitable scale 20.

The scale 20, being correctly calibrated at the price per pound, or other unit of measure desired, the dial 25 calibrated to indicate the weight of the article on the scale-pan and the dial 26 calibrated to indicate the total cost, respectively, it will be seen that it is only necessary to set the index 19 at the unit price on scale 20 and the weight of an article placed in the scale pan 5 will be indicated upon the dial 25 and the total cost thereof upon the dial 26 automatically by the relative movement of the indicators 23 and 24.

As many changes could be made in the above construction and many apparently widely different embodiments of my invention designed without departing from the scope thereof, I intend that all matter contained in the above description or shown in the accompanying drawings shall be interpreted as illustrative merely of an operative embodiment of my invention and not in a limiting sense.

What I claim is:—

1. In a weighing machine, in combination, a weight indicator, a cost indicator, a friction disk operatively connected to said weight indicator, means for communicating movement from said disk to said cost indicator, and means for varying the amount of movement so communicated.

2. In a weighing machine, in combination, a weight indicator, a cost indicator, a friction disk operatively connected to said weight indicator, an adjustable friction wheel operated by said disk, means for operating said cost indicator from said wheel, and means for varying the relative position of said disk and wheel.

3. In a weighing machine, in combination, a weight indicator, a rotatable cost indicator, a friction disk operatively connected to said weight indicator for operating said cost indicator, and means for varying the amount of relative movement of said cost indicator with relation to a given movement of said weight indicator.

4. In a weighing machine, in combination, a weight indicator, a cost indicator, a friction disk operatively connected to said weight indicator, a friction wheel adapted to be rotated by said friction disk, means for operating said cost indicator by said friction wheel, and means for varying the amount of relative movement between said disk and wheel.

5. In a weighing machine, in combination, a weight indicator, a cost indicator, a friction disk operatively connected with said weight indicator, a friction wheel adapted to be rotated by said friction disk for operating said cost indicator, and adjustable means for varying the amount of relative movement of said indicators.

6. In a weighing machine, in combination, a weight indicator, a cost indicator, a friction disk operatively connected with said weight indicator, a friction wheel adapted to be rotated by said friction disk for operating said cost indicator, adjustable means for varying the amount of relative movement of said indicators, and an indicator operated by said adjustable means adapted to indicate the relative movement of said weight and cost indicator in any desired terms.

7. In a weighing machine, in combination, a weight indicator, a cost indicator, a friction disk operatively connected with said weight indicator, a friction wheel rotated thereby, said disk having a portion thereof constructed so as to permit an adjustment between said disk and said wheel operated thereby, means for operating said cost indicator from said friction wheel, and means for varying the amount of relative movement of said disk and wheel.

8. In a weighing machine, in combination, a weight indicator, a cost indicator, a friction disk operatively connected with said weight indicator and having a recess in the operating surface thereof, a friction wheel adapted to be rotated by said friction disk and to operate said cost indicator, and means for varying the amount of relative movement of said disk and wheel.

9. In a weighing machine, in combination, a weight indicator, a cost indicator, a friction disk operatively connected to said weight indicator and having a radially extending recess in the operating surface thereof, a friction wheel adapted to be rotated by said friction disk and to operate said cost indicator, and means for varying the amount of relative movement between said disk and wheel.

10. In a weighing machine, in combination, a weight indicator, a cost indicator, a friction disk operatively connected with said weight indicator, a friction wheel adjustable radially in relation to said disk and adapted to be rotated thereby to operate said cost indicator, and means for varying the amount of relative movement between said disk and wheel.

11. In a weighing machine, in combination, a weight indicator, a cost indicator, parallel shafts operatively connected to said indicators, a friction disk carried by one of said shafts, a friction wheel slidably mounted upon a shaft positioned at right angles to said indicator shafts, said friction wheel being so positioned in relation to said friction disk that as the same is rotated such rotation will be communicated to said latter shaft, said shaft adapted to carry said friction wheel, means for operating said cost indicator from said latter shaft, and means to slide said friction wheel upon its shaft to vary the amount of relative rotation between said shafts.

12. In a weighing machine, in combination, a weight indicator, a cost indicator, parallel shafts operatively connected to said indicators, a friction disk carried by one of said shafts, a friction wheel slidably mounted upon a shaft positioned at right angles to said indicator shafts, said friction wheel being so positioned in relation to said friction disk that as the same is rotated such rotation will be communicated to said latter shaft, said shaft adapted to carry said friction wheel, a gear mounted upon said cost indicator shaft, a gear mounted upon said friction wheel shaft and in operative engagement with said former gear, a support adapted to slide said friction wheel upon its shaft, and an indicator adapted to indicate the position of said friction wheel in the desired terms.

13. In a weighing machine, in combination, a weight indicator, a friction disk operatively connected with said weight indicator, a friction wheel adapted to be rotated by said friction disk, means for operating another indicator from said friction wheel, and another indicator, said friction wheel and said friction disk being so formed and arranged as to be out of contact when said weight indicator occupies a predetermined position relatively thereto.

14. In a weighing machine, in combination, a weight indicator, a friction disk operatively connected with said weight indicator, a friction wheel adapted to be rotated by said friction disk, means for operating a cost indicator by said friction wheel, a cost indicator adapted to be operated by said friction wheel, said friction wheel and said friction disk being so formed and relatively positioned as to be out of contact when said weight indicator occupies a predetermined position relatively thereto.

15. In a weighing machine, in combination, a weight indicator, a friction disk operatively connected to said weight indicator, a friction wheel adapted to be rotated by said friction disk and to operate another indicator, another indicator, means for operating said last named indicator from said friction wheel, and means for varying the amount of relative movement between said disk and wheel, said disk and said wheel being so formed and relatively positioned as to be out of contact when said weight indicator occupies a predetermined position relatively thereto.

Signed at Schenectady in the county of Schenectady and State of New York this 21st day of June A. D. 1906.

MAGNUS UNGER.

Witnesses:
  GEORGE H. SMITH,
  CATHERINE HEATH.